United States Patent [19]

Mochizuki

[11] 4,154,151

[45] May 15, 1979

[54] TOASTING-TIME CONTROLLER FOR TOASTER

[75] Inventor: Takeo Mochizuki, Tokyo, Japan

[73] Assignee: Tokyo Electric Co., Ltd., Tokyo, Japan

[21] Appl. No.: 815,642

[22] Filed: Jul. 14, 1977

[30] Foreign Application Priority Data

Jul. 16, 1976 [JP] Japan .............................. 51/84558
Jul. 16, 1976 [JP] Japan .............................. 51/84561
Jul. 16, 1976 [JP] Japan .............................. 51/84562

[51] Int. Cl.² ........................................... A47J 37/08
[52] U.S. Cl. ................................... 99/326; 99/329 R
[58] Field of Search ................... 99/326, 325, 327–328, 99/329 R, 331–332, 333–334

[56] References Cited

U.S. PATENT DOCUMENTS

| 2,560,388 | 7/1951 | Olving | 99/328 |
| 3,202,799 | 8/1965 | Andrews | 99/329 R X |
| 3,208,371 | 9/1965 | Chivers | 99/329 R |
| 3,426,671 | 2/1969 | Sato | 99/329 R |
| 3,575,102 | 4/1971 | Parr | 99/328 X |

FOREIGN PATENT DOCUMENTS 26459 11/1968 Japan.

*Primary Examiner*—Harvey C. Hornsby
*Assistant Examiner*—Arthur O. Henderson
*Attorney, Agent, or Firm*—Oblon, Fisher, Spivak, McClelland & Maier

[57] ABSTRACT

A toasting-time controller for a toaster, having a setting lever formed integrally with bread supports in the toasting chamber and adapted to turn on a power supply switch when lowered, an energizing control section for setting the setting lever at a lowered position, a bimetal provided outside the toasting chamber, a bimetal switch for controlling energizing of the bimetal in response to a plurality of times of deformation of the bimetal, an operating member adapted to perform a seesaw motion in response to the deformation of the bimetal made at least in one direction, a control rod adapted to perform a linear motion by the use of pawls connected to the operating member and adapted to free the energizing control section at a predetermined position, and a release member for releasing interlocking of the pawls and the control rod.

7 Claims, 13 Drawing Figures

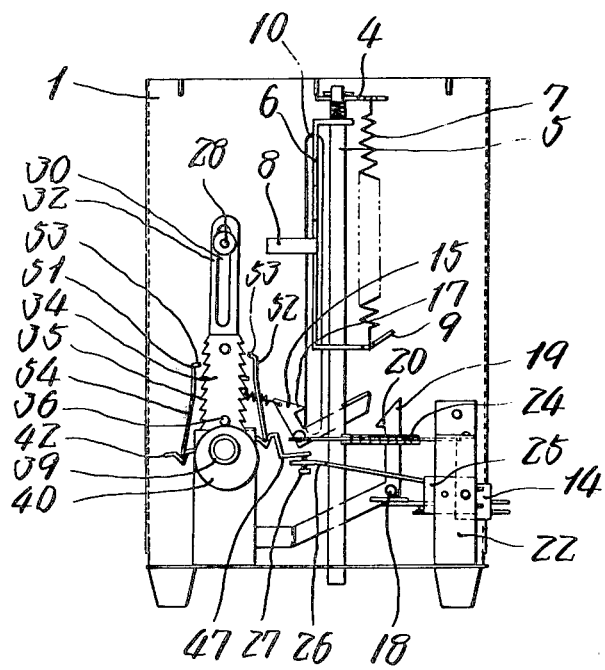
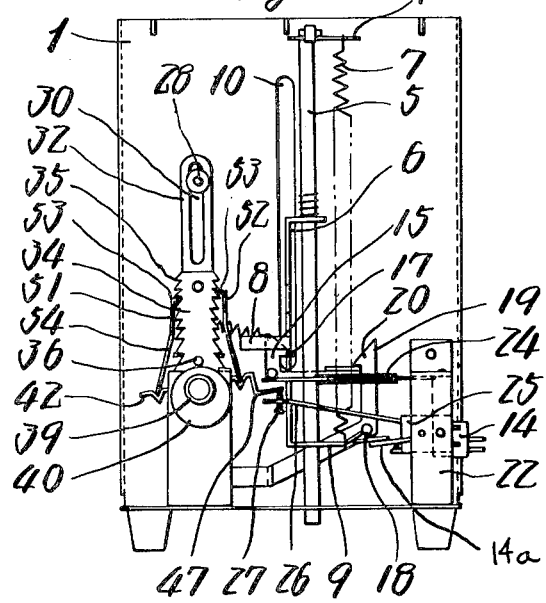

TOASTING-TIME CONTROLLER FOR TOASTER

BACKGROUND OF THE INVENTION

1. Field of the Invention

The present invention relates to a toasting-time controller for a toaster and, more particularly, to a toasting-time controller adapted to control the energizing time of the toasting heater of a toaster by the action of a bimetal installed externally of the toasting chamber of the toaster.

2. Description of the Prior Art

Many types of toasters, adapted to automatically control energizing of the toasting heater so as to toast slices of bread to a desired degree of browning, have been heretofore put into practical use. For instance, there are toasters of the type adapted to make the toasting time constant. The toaster of this type has a mechanical timer, which starts operation simultaneously when the toasting heater begins to be energized and which stops operation to deenergize the toasting heater when a predetermined time set thereby has elapsed. Thus the toaster of this type has advantages in that the energizing time of the toasting heater is very accurate relative to its set value and in that it can securely hop up slices of toast. In such a toaster, however, the energizing time of the toasting heater is set totally independently of the power supply voltage and ambient temperature; therefore the temperature of sliced bread just after toasting is not necessarily constant, however accurate the above-mentioned energizing time may be determined. In other words, such factors as power source voltage and ambient temperature must be taken into consideration in addition to time to toast slices of bread to a constant degree of browning; accordingly it is desirable that the above energizing time should be changed according to changes in power source voltage and ambient temperature. For this reason, the toaster of the above-mentioned type which controls only the above energizing time cannot toast slices of bread uniformly.

In view of the above facts, there have been proposed toasters of the type which control the above energizing time in consideration of the power source voltage and ambient temperature. Of such toasters, those of which are called the "internal bimetal" type have an energizing-time controlling bimetal installed in the toasting chamber in which the toasting heater is provided. In the toaster of this type, the bimetal is deformed under the influence of the temperature inside the toasting chamber elevated by heat generated from the toasting heater; thus the bimetal may deform in response to changes in power source voltage and ambient temperature and thereby the energizing time of the toasting heater may be determined in consideration of changes in power source voltage and ambient temperature; as a result, the toaster of this type can advantageously toast slices of bread substantially uniformly. However, the toaster of this type has a fatal disadvantage in that it cannot carry out a second toasting immediately after a first toasting is completed because the bimetal once bent in the first toasting cannot return to its original state immediately. In order to perform toasting operations successively, it is necessary to provide an interval between two successive toasting operations so as to sufficiently lower the temperature inside the toasting chamber. In addition, the toaster of this type has another disadvantage in that the bimetal must be set in the vicinity of the surface of sliced bread to be browned and therefore prevents radiant heat partially from reaching the sliced bread with the result that the sliced bread is unevenly browned and accordingly becomes poor in appearance. In the toaster of the above-mentioned internal bimetal type, which detects elevation of the temperature in the toasting chamber, there also exists a disadvantage in that the bimetal must be set at a predetermined position and therefore the time setting for the toaster tends to greatly vary with the loading condition. For instance, the toaster of the type capable of toasting up to two slices of bread at one time can correctly set the toasting time when two slices of bread are placed therein for toasting; if, however, only one slice of bread is placed therein for toasting, heat supplied to the bimetal greatly varies with the position of the slice of bread and therefore the toasting time becomes inaccurate with the result that the slice of bread cannot be browned to a desired degree. In terms of fabrication, such a toaster also has a disadvantage in that it requires adjustment of the toasting time after assembly since it cannot provide a proper toasting time by the assembly alone; in addition, the adjustment requires a very long time since it must use proper loads, for instance, slices of bread or imitation bread made of asbestos or the like to ensure high accuracy.

In view of the above disadvantages of the toaster of the internal bimetal type, there is also provided a toaster of the external bimetal type in which the bimetal is set externally of the toasting chamber and is adapted to be heated by a heater provided separately from the toasting heater. As in the case of the internal-bimetal type toaster, the toaster of the external bimetal type can set the toasting time in consideration of the power source voltage and ambient temperature. In addition, immediately after one toasting operation is completed, it can perform setting of the bimetal for the next toasting operation.

However, the deformation of the bimetal is not proportionally related to time, the deformation rate being the largest at the start of energizing and becoming smaller with the lapse of time; therefore, the bimetal must be so installed that the interval between its switching-on operation after heating and its switching-off operation after cooling may correspond to the range where the deformation rate is small and, as a result, correct on-off operation can hardly be expected. Especially important is the fact that the deformation of the bimetal is related to the power source voltage, the variation of time relative to that of the power source voltage being too great to stabilize the operating points. Besides, the above-mentioned features of the bimetal lead to the results that the shorter the toasting time, the higher the time accuracy and the longer the toasting time, the lower the time accuracy becomes and therefore, the toasting time cannot be lengthened beyond a certain extent. Such a time innaccuracy problem is aggravated as the output of the toasting heater gets lower; and thus, it is generally impossible to set a long toasting time for a low-output toaster.

BRIEF SUMMARY OF THE INVENTION

It is an object of the present invention to provide a toasting-time controller for a toaster of the so-called hopping-up and external-bimetal type which can set a very accurate toasting time thereby enabling uniform browning of sliced bread.

It is another object of the present invention to provide a toasting-time controller, each control section of which can be easily restored to its original position after one toasting operation is completed.

It is still another object of the present invention to provide a toasting-time controller which can give sliced bread any desired degree of browning as occasion demands.

It is a further object of the present invention to provide a toasting-time controller which can reduce, relative to the toasting time of a first toasting operation, the toasting time of a second and subsequent toasting operations thereby to uniformalize the degree of browning of sliced bread throughout a series of successive toasting operations.

It is a still further object of the present invention to provide a toasting-time controller simple in construction.

According to the present invention, there is provided a toasting-time controller for a toaster having a toasting chamber, toasting heaters provided in the toasting chamber, and bread supports provided between the toasting heaters, comprising a setting lever formed integrally with the bread supports and adapted to turn on a power supply switch when lowered, an energizing control section for setting the setting lever at a lowered position, a bimetal provided outside the toasting chamber, a bimetal switch for controlling energizing of the bimetal in response to a plurality of times of the deformation of the bimetal, an operating member adapted to perform a seesaw motion in response to the deformation of the bimetal made at least in one direction, a control rod adapted to perform a linear motion by the use of pawls connected to the operating member and adapted to free the energizing control section at a predetermined position, and a release member for releasing interlocking of the pawls and the control rod.

BRIEF DESCRIPTION OF THE DRAWINGS

FIG. 4 is a side view of the toasting-time controller in a released state;

FIG. 5 is a side view of the toasting-time controller in a set state;

DETAILED DESCRIPTION OF THE PREFERRED EMBODIMENTS

Figure 1:
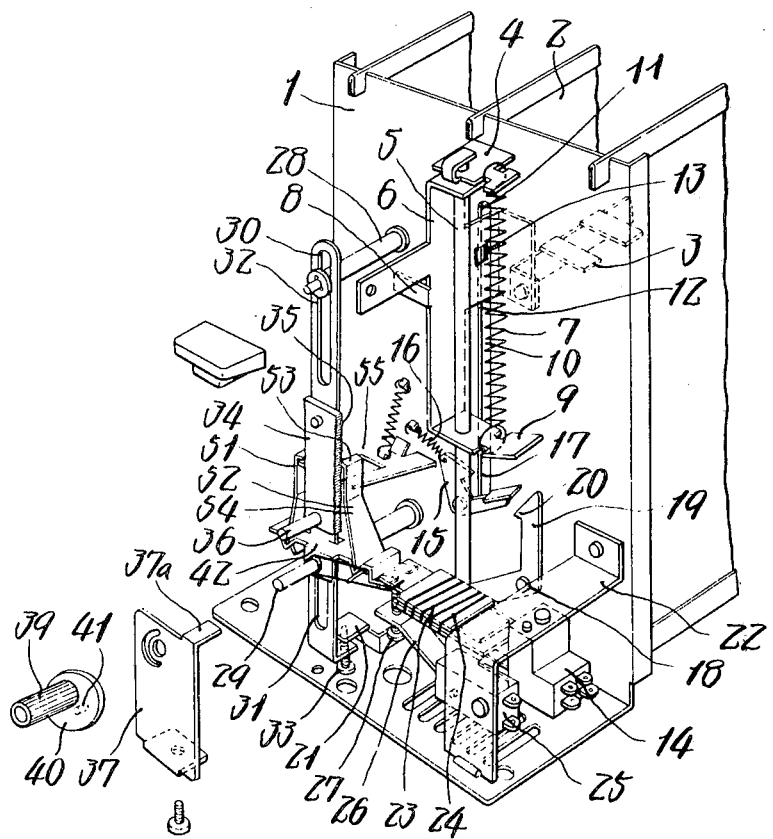
FIG. 1 is a perspective view of a toasting-time controller for a toaster according to one preferred embodiment of the present invention.
Figure 2:
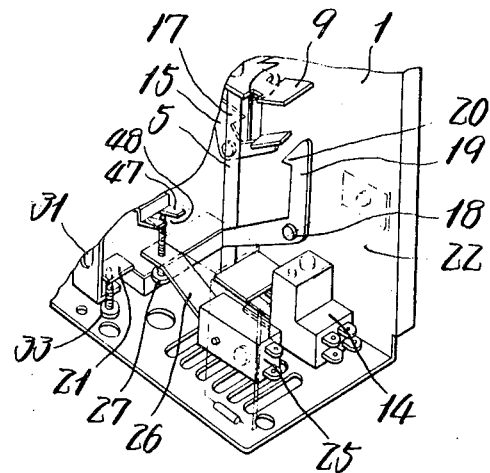
FIG. 2 is a part of FIG. 1.
Figure 3:
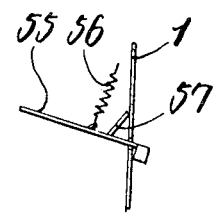
FIG. 3 is a side view of a release member of the toasting-time controller according to the present invention.
Figure 6:
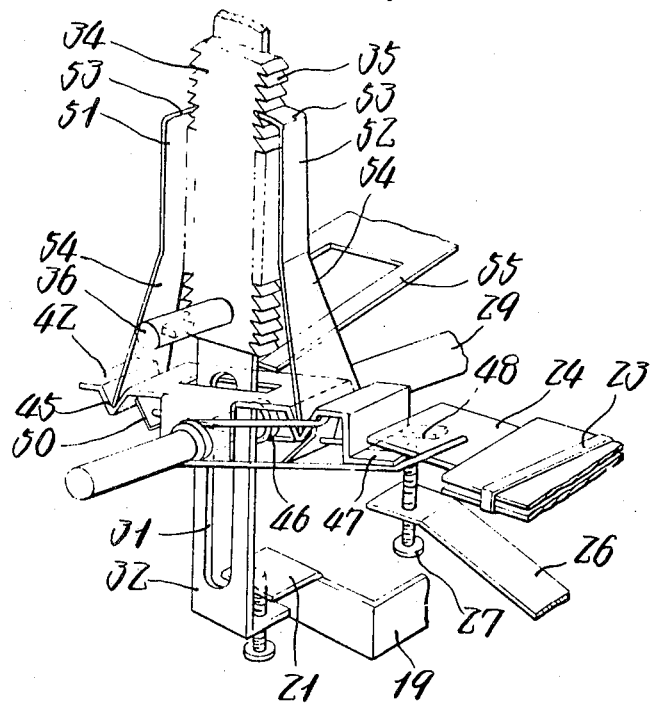
FIG. 6 is an enlarged perspective view of a part of the toasting-time controller of the present invention.
Figure 7:
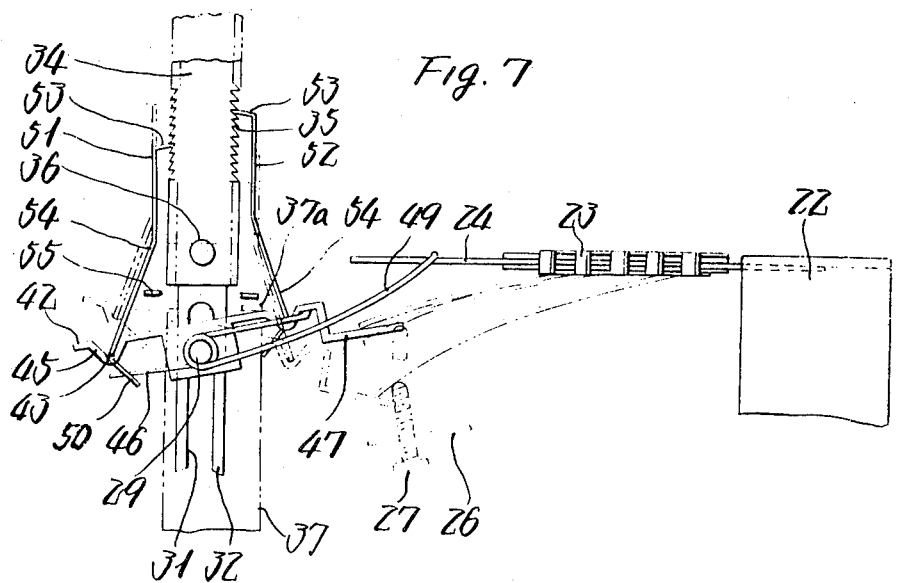
FIG. 7 is a side view of the part shown in FIG. 6.
Figure 8:
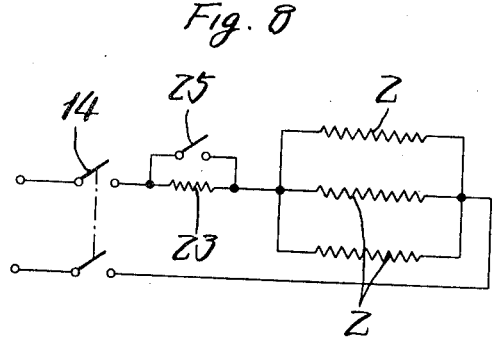
FIG. 8 is the electric circuit of the toasting-time controller according to the present invention.
Figure 9:
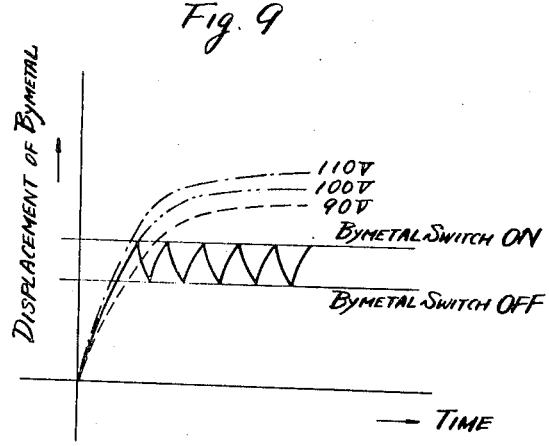
FIG. 9 is a diagram showing the relationship between time and bimetal deformation.

Now a preferred embodiment of the present invention will be hereinafter described with reference to FIGS. 1 to 9.

Reference numeral 1 designates a pair of main frames provided opposite to each other, though only one frame is shown. Three sheet-shaped toasting heaters 2 are provided at regular intervals between the main frames 1. Bread supports 3 are provided between the adjacent toasting heaters 2. The bread supports 3 are connected to a setting lever 6 fitted onto an elevating shaft 5 fixed to shaft supporter 4 installed on the main frame 1. The setting lever 6 is at all times urged upwardly by the action of a tension spring 7. In addition, the setting lever 6 has a mid-section projection 8 projected from the middle part thereof and a lower-section projection 9 projected slightly upwardly from the lower part thereof. The main frame 1 is provided with an elongated slide hole 10. The setting lever 6 is connected to the bread supporters 3 through a connection 11 thereof inserted in the slide hole 10. The connection 11 has a square hole 13 formed slightly above the lower edge 12 thereof. A hook lever 15 is rotatably mounted on the main frame 1, being urged counterclockwise by the action of a tension spring 16 so that it may be rotated by the lower edge 12 of the connection 11 when the setting lever 6 is lowered and thereby the lower-section projection 9 turns the main switch 14 on by contact with switch arm 14a as shown in FIG. 5. At this time, the hook lever 15 is rotated clockwise to make the hook section 17 thereof enter the square hole 13 thereby locking the setting lever 6 and, simultaneously, the hook lever 15 itself is prevented from restoring its original position by the action of the hook 20 of an upward-operating lever 19 rotatably mounted on a pin 18. The lever 19 extends towards the left front and has a flat receiver 21 at the end of the extended portion thereof. In this invention, the setting lever 6, hook lever 15 and the upward-operating lever 19 are commonly referred to as an energizing-control section.

The main frame 1 is provided with an L-shaped auxiliary frame 22 at its front. A bimetal 24 is fixed, at its one end, to the upper section of the L-shaped auxiliary frame 22 wound with a bimetal heater 23. A bimetal switch 25 is provided under the bimetal 24 to control energizing of the bimetal heater 23, and has an arm 26 at the leading end of which an adjusting screw 27 is mounted. The adjusting screw 27 is disposed from the bimetal 24 by a predetermined distance before energizing of the bimetal.

Moreover, the main frame 1 has, on its upper left side portion, a control-rod supporting shaft 28 horizontally provided, and has on its lower leftside portion an operating-member supporting shaft 29 provided horizontally just below the shaft 28. A control rod or member 32 is provided which has elongated holes 30 and 31 in which the above shafts 28 and 29 are fitted respectively so that the control rod 32 may be moved vertically. The control rod 32 has, at its lower end, a bent portion on which is provided an adjusting screw 33 opposite to the receiver 21 of the upward-operating lever 19. An auxiliary member 34 is mounted on the control rod 32, and has saw-teeth formed on its both sides. A relatively long pin 36 is horizontally fixed to the lower part of the auxiliary member 34. At the front lower portion there is provided a cam holder 37 fitted onto the operating-member supporting shaft 29 on which a cam 40 with a knob 39 is rotatably mounted under the pin 36. At the back of the cam 40, there is provided a dowel 41 formed integrally with the cam 40 so that the rotating angle of the cam 40 may be controlled in cooperation with the cam holder 37. The cam holder 37 has a stopper 37a for positioning on operating member which will be later described.

An operating member 42 acting as a motion converter is rotatably mounted on the operating-member supporting shaft 29 so as to perform a seesaw motion. The operating member 42 is in the form of a wing, and has, at its both sides, upwardly-diverging V-shaped fulcra 45 each having a hole 43 at the center thereof; a torsion spring 46 also being provided under the operating member 42 to urge pawls to be described later from outside inward; and, in addition, the operating member has, at its internal end, a contact section 47 positioned under the bimetal 24, the contact section 47 having at its middle portion a relief notch 48 to avoid contact with the adjusting screw 27. A torsion spring 49 wound around the operating-member supporting shaft 29 engages at the ends thereof with the bimetal 24 and the operating member 42, respectively, so as to urge the operating member 42 counter-clockwise. Pawls 51 and 52 are supported on the fulcrums 45 of the operating member 42, respectively, each of them having a tongue 50 projecting downward through the hole 43 at the fulcrum 45. The above-mentioned torsion spring 46 urges the pawls 51 and 52 from outside inward in cooperation with the tongues 50. Each of these pawls 51 and 52 has at the top thereof a bent section 53 for engaging with the sawteeth 35. As shown, the pawls 51 and 52 face each other and have inclined sections 54 at the lower parts thereof, respectively, so that lower parts thereof may diverge from each other. Between these inclined parts 54 of the pawls 51 and 52, there is inserted a release member 55. The release member 55 is rotatably mounted on the main frame 1, being at all times urged upwardly by the action of a tension spring 56 and, in addition, its uppermost position being limited by the stopper 57. During the free or released state, the release member 55 push the pawls 51 and 52 apart from each other to disengage them from the sawteeth 35.

With the construction mentioned above, the toasting-time controller of the present invention is operated as follows:

When the setting lever 6 is lowered with sliced bread on the bread supporters 3, the lever 6 is set at a predetermined position by the hook section 17 of the hook lever 15 stopped by the upward-operating lever 19. As a result, the upward-operating lever 19 is also locked at a given position. The above operation to set the setting lever 6 is accompanied by the following two movements: first, the lower projection 9 of the setting lever 6 depresses the main switch 14 to turn on the power supply; and second, the mid-section projection 8 pushes down the release member 55 to free the pawls 51 and 52. In this manner, each toasting heater 2 is energized through the bimetal heater 23 and thus the bimetal 24 is bent to lower its leading end. In the first toasting operation, there is some distance between the adjusting screw 27 and the bimetal 24 to allow enough time for elevating the temperature inside the main frames to the toasting temperature. When, therefore, a predetermined time has elapsed, the end of the bimetal 24 comes into contact with either the contact section 47 of the operating member 42 or the adjusting screw 27 depending upon the adjusting condition of the adjusting screw 27. When the bimetal 24 is further deformed, it rotates the operating member 42 clockwise and the pawl 51 is thereby elevated and the pawl 52 is lowered. The above up-and-down movements of the pawls 51 and 52 are carried out while the bent sections 53 of the pawls 51 and 52 are engaging with the downwardly inclined sawteeth 35; therefore, the control rod 32 is also elevated by a distance equal to that of the upward movement of the pawl 51. At this time, the bimetal 24 is in contact with the operating member 42 as mentioned above and thereby the force of the torsion spring 49 is offset with the consequent result that the external force created by the torsion spring 49 is not applied to the operating member 42. When the bimetal 24 is lowered to a predetermined position in this manner, the arm 26 is downwardly rotated through the adjusting screw 27 to turn the bimetal switch 25 on. As a result, the toasting heaters 2 are still kept energized, through the bimetal heater 23 is deenergized. Accordingly, the bimetal 24 enters a cooling cycle, and its leading end is gradually lifted. Such an upward movement of the bimetal end results in a counter-clockwise rotation of the operating member 42 since the bimetal 24 is connected to the operating members 42 through the torsion spring 49; in addition, the pawl 51 is lowered and the pawl 52 is elevated to lift the control rod 32. When, in this manner, the end of the bimetal 24 is lifted to a predetermined point, the bimetal switch 25 is turned off to energize the bimetal heater 23 again. Thus, the bimetal 24 enters a heating cycle again and therefore its end begins to lower again. These heating and cooling cycles are repeated several times. In this case, the travel of the end of the bimetal 24 is approximately proportional to the lifting travel of the control rod 32. After several repetitions of the cycles, the adjusting screw 33 pushes up the receiver 21 of the upward-operating lever 19 to disengage the lever 19 from the hook lever 15 to thereby free the setting lever 6. Thus, the setting lever 6 is hopped up together with the bread supports 3. In this manner, the main switch 14 is turned off and the release member 55 opens the pawls 51 and 52 apart to free the control rod 32. As a result, the control rod 32 naturally falls and the pin 36 thereby comes into contact with the cam 40 for positioning.

Thus, the first toasting operation is completed. If the second toasting operation is carried out immediately after the first one is completed, the temperature inside the free frames 1 is in a preheated condition and therefore the bimetal 24 is in contact with the adjusting screw 27 in many cases. In such cases, the control rod 32 begins upward movement as soon as the toasting operation starts. Even if the bimetal 24 is apart from the adjusting screw 27, the distance therebetween is very small and therefore the toasting time is shortened as a whole.

According to the present invention as mentioned above, the bimetal switch 25 is turned on and off in the range where the deformation of the bimetal 24 is large and therefore, minimized time error and very accurate toasting time can be achieved with almost no prior adjustment. Furthermore, in the above embodiment, toasting time may be set by rotating the cam 40 to place the control rod 32 at a desired position and the distance between the adjusting screw 33 and the receiver 21 is thereby changed for time setting.

In the above-mentioned embodiment, the upward movement of the control rod 32 is shown as being achieved by the use of the saw teeth 35, however, it may also be achieved by the use of the auxiliary member made of rubber or the like and the pawls 51 and 52 with needles on the edges thereof.

Figure 10:
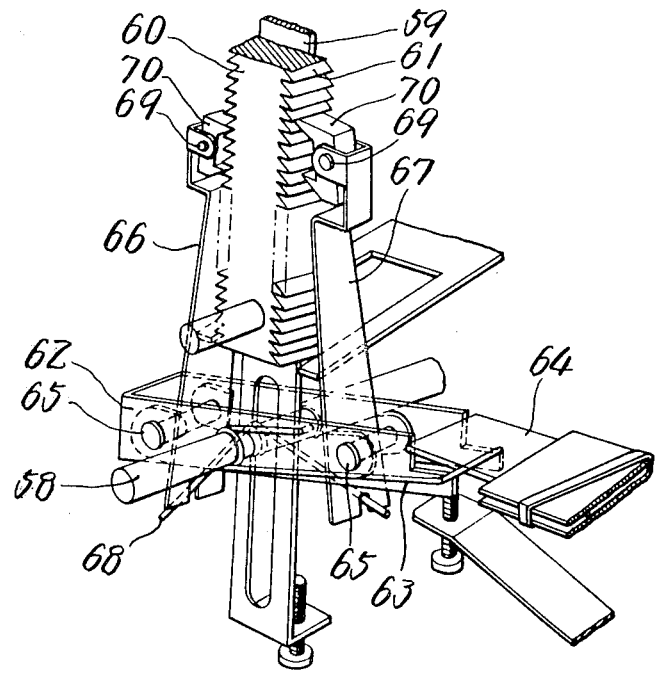
FIG. 10 is perspective view of a modified form of the toasting-time controller of the present invention.
Figure 11:
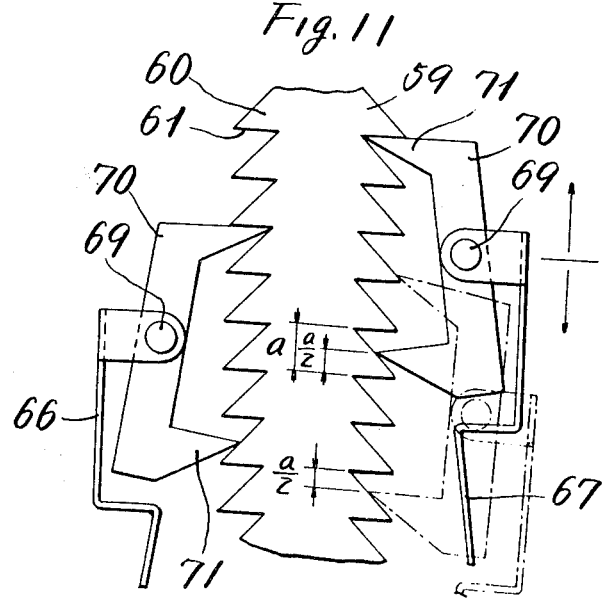
FIG. 11 is an elevational view of a part of the controller shown in FIG. 10.

Reference is now made to FIGS. 10 and 11 which show a modification of the present invention. A control rod 59 is vertically movably mounted on an operating-member supporting shaft 58. The control rod 59 is fixedly provided with an auxiliary member 60 having at both sides thereof saw teeth with a pitch of "a." A U-shaped operating member 62 is rotatably fixed, at about the middle of both arms thereof, to the operating-member supporting shaft 58. The operating member 62 and a bimetal 64 are connected each other through a torsion spring 63. The operating member 62 is provided, across the both ends of its arms, with pins 65. Push-up members 66 and 67, acting as pawl members, are provided on the pins 65 so that they may face each other and be generally in the form of an inverted V. A torsion spring 68 engages with the bottom portions of the push-up members 66 and 67 so that the upper portions of the push-up members 66 and 67 may be urged from the outside inward. Each of the push-up members 66 and 67 is provided, at the top thereof, with an engaging-pawl member 70. The engaging-pawl member 70 has two hook pawls 71 formed at an interval corresponding to a value obtained by multiplying the pitch of the saw teeth 61 by a factor of an integer and a half. In this example, therefore, the control rod 59 is elevated in response to the deformation of the bimetal 64 as a matter of course as in the case of the first embodiment. Furthermore, the use of two hook pawls 71 having the above specified pitch makes it possible to give the upward travel of the control rod 59 in an increment of a half of the pitch "a" of the saw teeth 61, unlike the first embodiment which gives the above travel in an increment of the pitch "a" of the saw teeth. For this reason, time setting can be made more accurate in this example.

Figure 12:
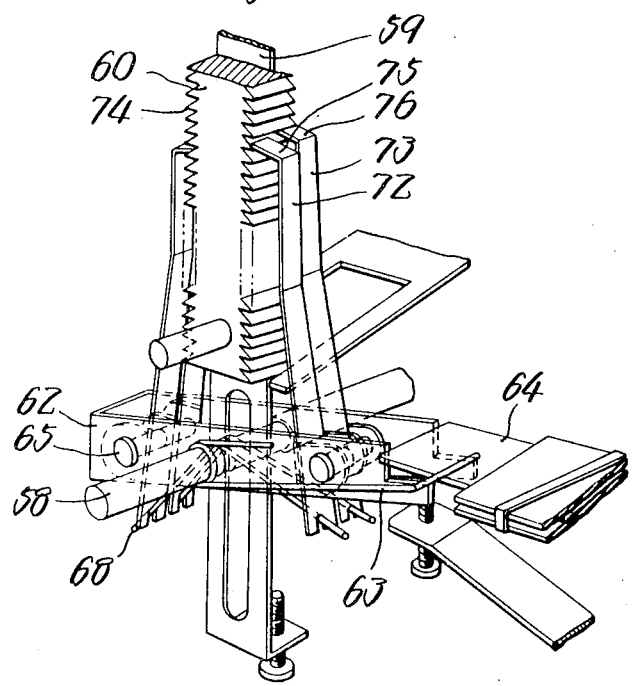
FIG. 12 is a perspective view of another modification of the toasting-time controller of the present invention.
Figure 13:
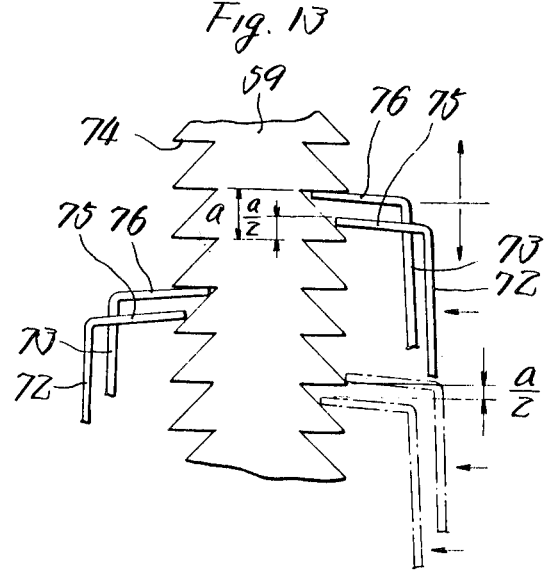
FIG. 13 is an elevational view of a part of the controller shown in FIG. 12.

Another modification will be described hereinafter with reference to FIGS. 12 and 13. In this modification, each pawl is longitudinally halved into pawls 72 and 73; the bent portions 75 and 76 in mesh with saw teeth 74 are shifted in height from each other by a half of the pitch of the saw teeth 74. In this modification, therefore, the control rod 59 may be moved up in a fine increment as in the case of the first modification as mentioned above.

In every example, the control rod may be so formed that it is operated in response to the movement of the bimetal only in one specified direction.

Obviously many modifications and variations of the present invention are possible in the light of the above teachings. It is therefore to be understood that within the scope of the appended claims the invention may be practiced otherwise than as specifically described.

What is claimed is:

1. A toasting-time controller for a toaster having a toasting chamber, toasting heaters provided in said toasting chamber, and moveable bread supports provided between said toasting heaters to permit bread to be disposed in an upper or lowered position with respect to said toasting chamber, which comprises a setting lever formed integrally with said bread supports and adapted to turn on a power supply switch when lowered, an energizing control section for setting and releasably securing said setting lever at a lowered position, a deformable bimetal provided outside said toasting chamber, a bimetal switch for controlling energizing for heating and cooling of said bimetal and to provide a plurality of deformations of said bimetal, an operating member including first and second pawls for performing an alternating motion in response to the deformation of said bimetal, a control rod connected to said operating member for performing a vertical linear motion by the motion of said pawls for freeing said energizing control section at a predetermined position, and a release member connected to said toasting chamber and engageable by said linear motion of said control rod for releasing interlocking of said pawls and said control rod.

2. The toasting-time controller as set forth in claim 1, wherein said control rod is formed to make a linear motion substantially vertically, to be elevated by the motion of said pawls, and to fall when disengaging from said pawls by said release member.

3. The toasting-time controller as set forth in claim 1, wherein said bimetal is spaced from said bimetal switch throughout the working range of said bimetal switch when said bimetal is in a normal state.

4. The toasting-time controller as set forth in claim 3, wherein a spring is provided between said bimetal and said operating member for driving said control rod so as to urge said bimetal and operating member towards each other.

5. The toasting-time controller as set forth in claim 4, wherein said bimetal and said operating member for driving said control rod are directly connected to each other so that said bimetal may come into contact with said bimetal switch independently of said operating member.

6. A toasting-time controller for a toaster having a toasting chamber, toasting heaters provided in said toasting chamber, and moveable bread supports provided between said toasting heaters to permit bread to be disposed in an upper or lowered position with respect to said toasting chamber, which comprises a power supply switch, a setting lever formed integrally with said bread supports and adapted to turn on said power supply when lowered, an energizing control section for setting said setting lever at a lowered position, a deformable bimetal provided outside said toasting chamber, a bimetal switch for controlling energizing for heating and cooling of said bimetal and to provide a plurality of deformations of said bimetal, an operating member including first and second pawls for performing an alternating motion in response to the deformation of said bimetal made at least in one direction, a control rod connected to said operating member for performing vertical linear motion by the motion of said pawls for freeing said energizing control section at a predetermined position, a release member connected to said toasting chamber and engageable by said linear motion of said control rod for releasing interlocking of said pawls and said control rod, an energizing-time control device for controlling energizing time by setting the stop position of said control rod in a released state and means for varying the distance up to the point where said energizing control section is freed connected to said toasting chamber.

7. The toasting-time controller as set forth in claim 6, wherein said control rod includes sawteeth disposed at both sides thereof with which said first and second pawls engage.

* * * * *